United States Patent

Stedman

[11] 4,052,804
[45] Oct. 11, 1977

[54] NON-ARTICULATED SCRAPER ARRANGEMENT

[75] Inventor: Robert N. Stedman, Chillicothe, Ill.

[73] Assignee: Caterpillar Tractor Co., Peoria, Ill.

[21] Appl. No.: 667,768

[22] Filed: Mar. 17, 1976

[51] Int. Cl.² ............................................. E02F 3/62
[52] U.S. Cl. .................................. 37/129; 180/43 R; 180/52; 280/95 R
[58] Field of Search ............ 37/124 R, 126 R, 126 A, 37/126 AA, 126 AB, 126 AC, 126 AD, 126 AE, 129; 180/43 R, 42, 79, 79.3, 85, 88, 52; 280/80 R, 95 R, 95 A

[56] References Cited

U.S. PATENT DOCUMENTS

| 2,018,653 | 10/1935 | Best | 280/95 R X |
|---|---|---|---|
| 2,133,652 | 10/1938 | Best | 280/95 R X |
| 2,134,515 | 10/1938 | Hoskyns | 280/95 R |
| 2,159,203 | 5/1939 | Chayne | 180/85 X |
| 2,371,864 | 3/1945 | Woolson et al. | 280/95 R |
| 2,403,325 | 7/1946 | Armington | 280/95 R X |
| 2,732,233 | 1/1956 | MacMillan et al. | 280/95 R X |
| 2,989,134 | 6/1961 | Kamlukin et al. | 280/95 R X |
| 3,047,307 | 7/1962 | Beyerstedt | 280/95 R |
| 3,118,686 | 1/1964 | McAdams | 37/129 X |
| 3,129,522 | 4/1964 | Rockwell et al. | 37/129 |
| 3,157,395 | 11/1964 | Budzywski et al. | 180/43 R X |
| 3,181,641 | 5/1965 | Haddad | 180/42 |
| 3,411,804 | 11/1968 | Hill et al. | 280/95 R |
| 3,462,860 | 8/1969 | Hermiz et al. | 37/129 |
| 3,524,513 | 8/1970 | Williams | 37/129 X |
| 3,533,174 | 10/1970 | Carston | 37/129 X |
| 3,758,129 | 9/1973 | Ishikawa et al. | 180/43 R X |
| 3,934,362 | 1/1976 | Hyler | 37/126 R X |
| 3,942,815 | 3/1976 | Schwenk et al. | 180/43 R X |
| 3,962,804 | 6/1976 | Hyler | 37/129 |

Primary Examiner—E. H. Eickholt
Attorney, Agent, or Firm—Phillips, Moore, Weissenberger, Lempio & Majestic

[57] ABSTRACT

A scraper comprises a front frame having an operator's station mounted forwardly thereon. A generally vertically disposed suspension cylinder is pivotally interconnected between the front frame and each one of a pair of front roadwheels for permitting the roadwheels to pivot in a horizontal plane for steering purposes. A steering linkage is pivotally interconnected between the front frame and the roadwheels to effect such steering. A rear frame, having a scraper bowl secured thereon, is mounted on a pair of rear roadwheels. A pair of draft arms, disposed on either side of the scraper bowl, are pivotally interconnected directly to the scraper bowl and to the front frame along with a lift cylinder for selectively raising and lowering the scraper bowl relative to the front frame.

12 Claims, 6 Drawing Figures

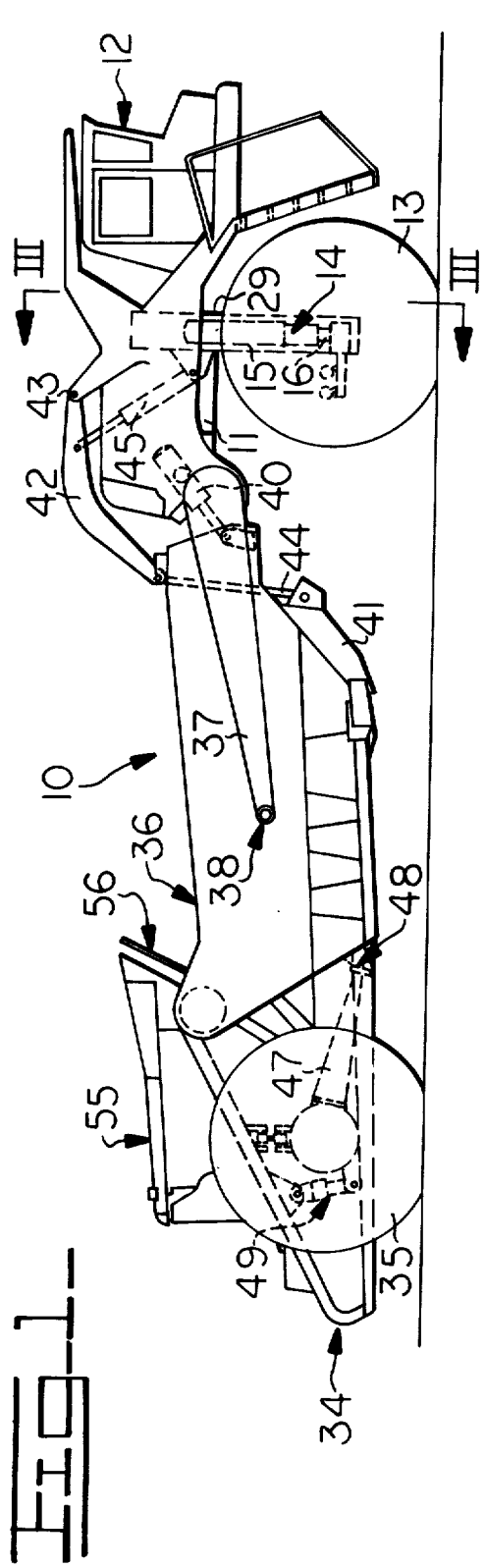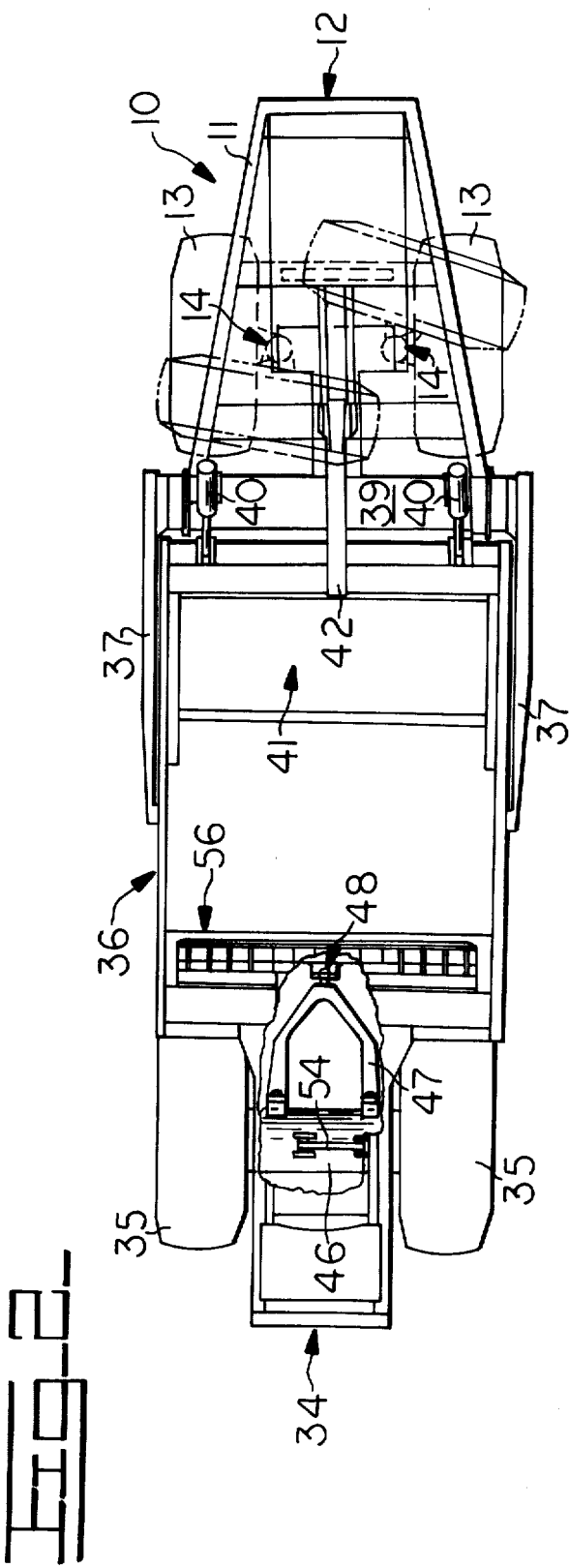

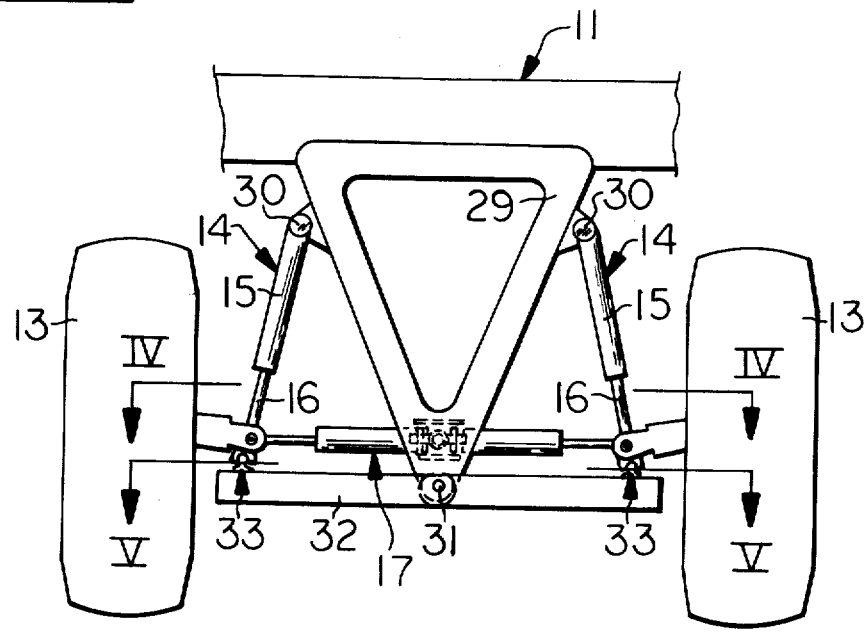
Fig_3_
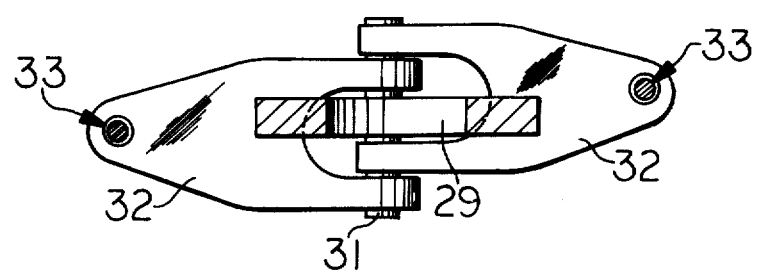
Fig_5_

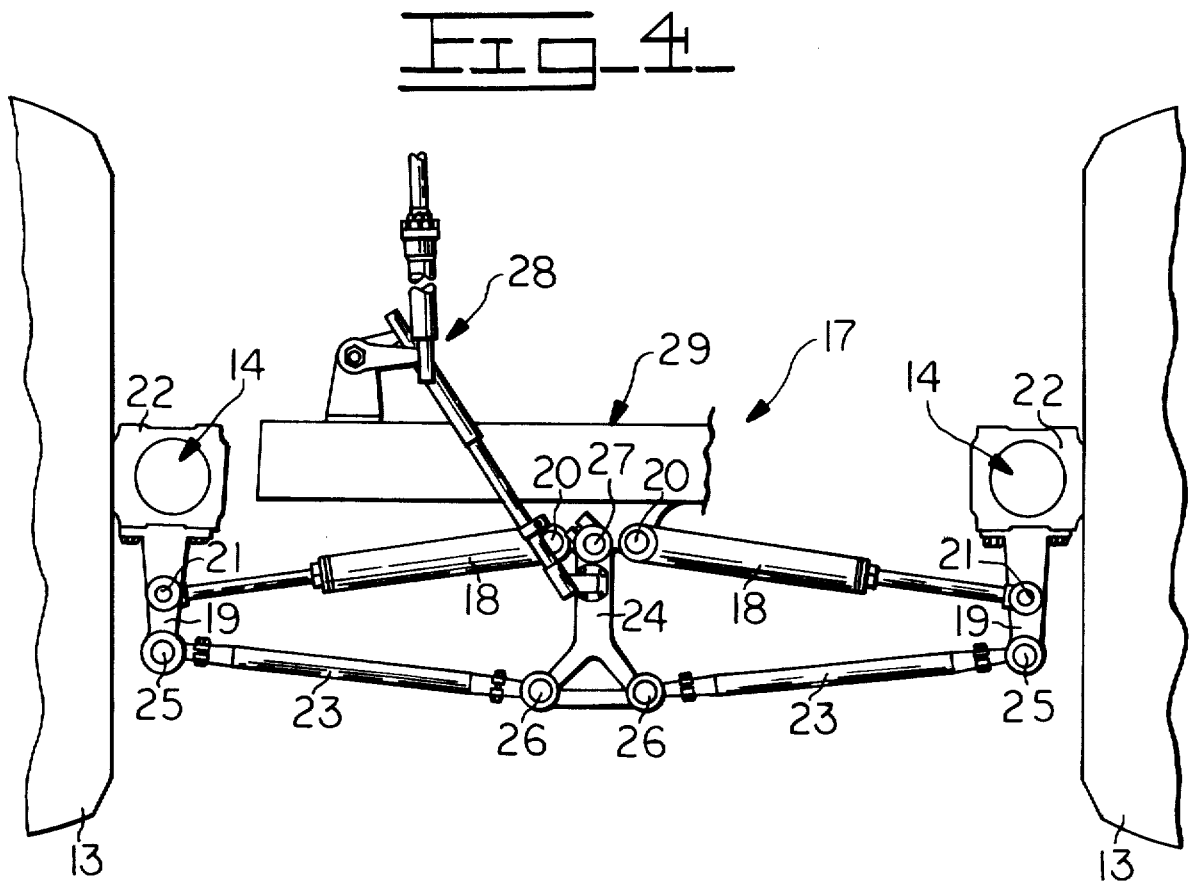
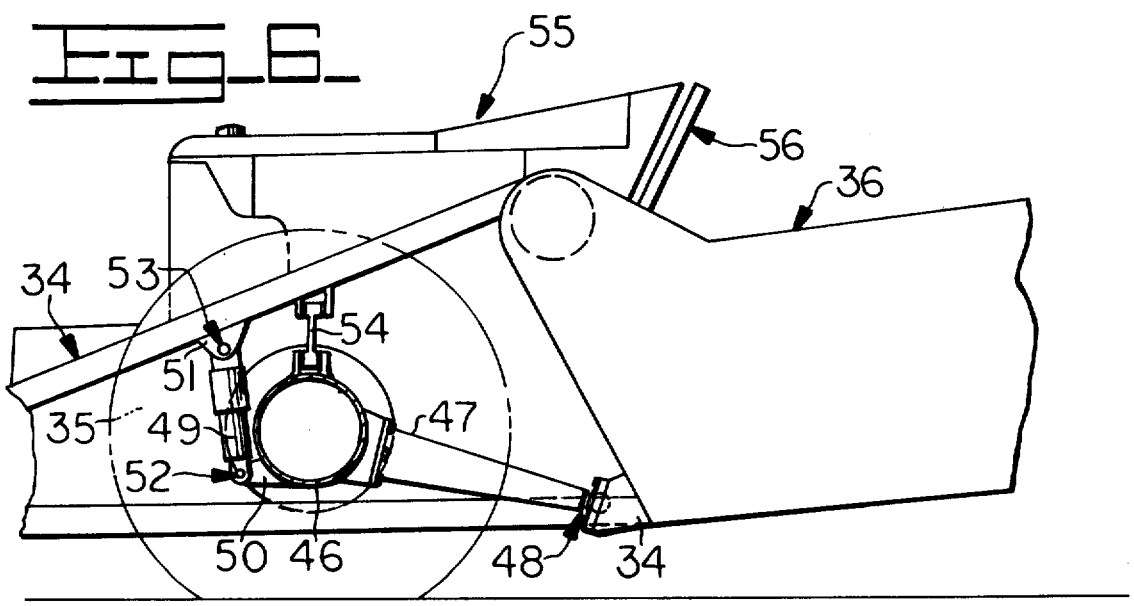

NON-ARTICULATED SCRAPER ARRANGEMENT

BACKGROUND OF THE INVENTION

This invention relates to a scraper of the type having a bowl adapted to be lowered into engagement with the ground for earth loading purposes. Conventional scrapers normally comprise a tractor having the bowl articulated thereto by a gooseneck and attendant hitch mechanisms. The roadwheels supporting the tractor are non-steerable with the steering being effected by a pair of steering cylinders pivotally interconnected between the gooseneck and a hitch frame. In addition, the tractor normally comprises an internal combustion engine for propelling the scraper during earthworking and transport operations.

SUMMARY OF THIS INVENTION

An object of this invention is to provide an improved non-articulated scraper arrangement which substantially eliminates the above, briefly described gooseneck and hitch mechanisms and which provides automotive steering and independent suspension systems for roadwheels thereof.

In particular, the scraper arrangement of this invention comprises a front frame mounted on a pair of front roadwheels and an operator's station mounted forwardly on the frame to provide enhanced visibility thereat. A generally vertically disposed suspension cylinder means is pivotally interconnected between the front frame and each of the front roadwheels to provide the dual functions of shock absorption and king pin steering, permitting the roadwheels to pivot in a horizontal plane for steering purposes. A steering linkage, pivotally interconnected between the front frame and the front roadwheels, is provided to effect such steering.

A rear frame, having a scraper bowl secured thereon, is mounted for movement on a pair of rear roadwheels. A pair of draft arms, disposed on either side of the scraper bowl, are pivotally interconnected directly to the scraper bowl and to the front frame along with actuating means for selectively raising and lowering the scraper bowl. The engine for driving the scraper is preferably mounted on the rear frame and a suspension system also preferably mounts the rear roadwheels on the rear frame.

BRIEF DESCRIPTION OF THE DRAWINGS

Other objects of this invention will become apparent from the following description and accompanying drawings wherein:

FIG. 1 is a side elevational view of a non-articulated scraper arrangement, embodying this invention;

FIG. 2 is a top plan view of the scraper arrangement;

FIG. 3 is an enlarged front elevational view of a suspension and steering system for a pair of front roadwheels of the scraper arrangement, taken in the driection of arrows III—III in FIG. 1 and with parts broken-away for clarification purposes;

FIG. 4 is an enlarged top plan view of a steering linkage for the front roadwheels of the scraper, taken in the direction of arrows IV—IV in FIG. 3;

FIG. 5 is an enlarged top plan view, taken in the direction of arrows V—V in FIG. 3; and FIG. 6 is an enlarged side elevational view of a rearward portion of the scraper arrangement with portions thereof broken away for clarification purposes.

DETAILED DESCRIPTION

FIGS. 1 and 2 illustrate a scraper arrangement 10 comprising a front frame 11 having an operator's cab 12 mounted forwardly thereon and located on the central, longitudinal axis thereof. As shown in FIG. 1, a forward extension of the frame provides a canopy extending forwardly over the cab for protection purposes. A pair of front roadwheels 13 are each mounted under the front frame by a generally vertically disposed suspension cylinder 14 comprising a housing 15 having its upper end connected to the front frame.

A strut 16 of the suspension cylinder is reciprocally and rotatably mounted in the housing and has its lower end connected to a respective roadwheel to thus permit the roadwheels to pivot in a horizontal plane for steering purposes. The suspension cylinder thus functions as a steering king pin to provide a short turning circle for excellent maneuverability of the scraper arrangement. The otherwise conventional suspension cylinder further functions to absorb loading shocks and haul road bumps to provide a smooth ride and to reduce stresses which would otherwise be imposed on components of the scraper.

For example, when a roadwheel rolls over a bump, strut 16 will move upwardly in housing 15 to compress a volume of nitrogen contained therein. Such movement also forces oil into a rebound chamber through orifices (not shown) formed in the cylinder. Upon dropping of the roadwheel, the compressed nitrogen will function to push the strut in a smooth manner, back to its normal position. The orifices and a ball check valve (not shown) will control oil flow and rebound rate to prevent harsh rebounding. Since the suspension cylinder is of conventional design, further detailed description thereof is deemed unnecessary.

Referring to FIGS. 3 and 4, a steering linkage means 17 is pivotally interconnected between a V-shaped extension 29 of front frame 11 and the front roadwheels for selectively pivoting the roadwheels in a horizontal plane for steering purposes. Although the steering linkage means is conventional, per se, a brief description thereof will be made. The steering linkage means essentially comprises a pair of double-acting hydraulic steering cylinders 18, each pivotally interconnected between frame extension 29 and a steering arm 19 by pivot pins 20 and 21, respectively.

The steering arm is secured to a bracket 22 having an axle projecting therefrom which rotatably mounts a respective roadwheel 13 thereon. A tie rod 23 is pivotally interconnected between an outer end of each steering arm 19 and a forward, bifurcated end of a pitman arm 24 by pivot pins 25 and 26, respectively. The rearward end of the pitman arm is pivotally mounted on frame extension 29 by a pivot pin 27. A standard follow-up linkage 28 is suitably interconnected between frame 11 and pitman arm 24 to function in a conventional manner.

Referring to FIG. 3, the upper end of the housing for each suspension cylinder 14 is pivotally connected to vertically disposed and V-shaped extension 29 of front frame 11 by a pivot pin 30. Frame extension 29 extends downwardly to terminate at an apex whereat a pin 31 pivotally mounts inner ends of a pair of bifurcated links 32 in overlapped relationship thereat (FIG. 5). The outer end of each link is universally pivoted to a lower end of a respective strut 16 of the suspension cylinder by a ball and socket connection 33.

Referring to FIGS. 1, 2 and 6, the scraper arrangement further comprises a rear frame 34, rotatably mounted on a pair of rear roadwheels 35. A scraper bowl 36 is suitably secured on the rear frame and is connected to front frame 11 directly by a pair of draft arms 37, disposed on either side thereof. The rearward end of each draft arm is pivotally mounted on a side of the bowl by pivot means 38 and the forward end thereof is fixedly mounted in a conventional manner on an outboard end of a draft tube 39, secured rearwardly on front frame 11 (FIG. 2).

An actuating means, preferably in the form of a doubleacting hydraulic cylinder 40, is pivotally interconnected between a forward end of the bowl and a rearward end of front frame to selectively raise and lower the bowl upon actuation thereof. A conventional apron 41 is movably mounted on a forward end of the bowl to normally close the same. The apron is adapted to be opened and closed by actuating means comprising a lift arm or lever 42 having its forward end pivotally mounted on the front frame by a pin 43 and having its rearward end pivotally interconnected to the apron by a link 44. A double-acting hydraulic cylinder 45 is pivotally interconnected between the front frame and the lift arm to selectively open and close the apron.

Referring to FIGS. 1, 2 and 6, rear roadwheels 35 are each rotatably mounted on a common axle housing 46. The rearward ends of two rearwardly extending and laterally spaced legs of an A-frame 47 are suitably secured to a forward side of the axle housing. An apex and forward end of the frame is universally pivoted to a rearward end of rear frame 34 by a ball and socket connection 48.

A pair of suspension cylinders 49 ae each pivotally interconncted between a lug 50 secured on an outboard side of axle housing 46 and a lug 51 secured to an underside of frame 34 by ball and socket connections 52 and 53, respectively. The conventional suspension cylinders may be similar in their construction and function to above-described cylinders 14, attached to front roadwheels 13. A transversely disposed drag link 54 is pivotally interconnected between the axle housing and the rear frame in a conventional manner.

An internal combustion engine 55 is mounted on rear frame 34. The engine may be suitably connected to an electric generator (not shown) to selectively actuate electric drive motors (not shown) each mounted on frame 34 and drivingly connected to a rear roadwheel 35 by an intermediate stepped-down gear train and speed reducer (not shown). Similar drive motors could also be operatively connected to front roadwheels 13, if so desired.

From the above description, it can be seen that the scraper arrangement of this invention provides a number of advantages over conventional scrapers. One of the primary advantages resides in the substantial elimination of the standard articulated connection (gooseneck and hitch mechanisms) between a conventional scraper bowl and tractor. In addition to the obvious cost savings and shortening of the vehicle, the payload to empty weight ratio of applicant's scraper arrangement can be increased in the order of 1.35 to 1, as compared with a standard 1 to 1 ratio. The loaded horsepower to weight ratio can be maintained at about 1 to 299 lb., as compared with a 1 to 250-275 lb. ratio for a conventional single-engine scraper and a 1 to 350-400 lb. for a conventional two-engine scraper.

The independent suspension systems for the front and rear roadwheels provide further operational disiderata for the integrated scraper arrangement. Suspension struts 14, for example, are adapted to enhance the ride characteristics of the vehicle, reduce structural loads imposed on component parts and to function as king pins for steering purposes. In addition, the quantity of oil contained in the struts can be varied selectively, as is well known in the art, to closely control the depth of cut, i.e., to selectively vary the height of front frame 11 and thus scraper bowl 36 relative to ground level.

Another unique feature of the subject scraper arrangement is the disposition of operator's cab on the forward end of the front frame and on the longitudinal axis thereof. Such disposition affords the operator with enhanced visibility to the front, sides and rear of the vehicle, i.e., the operator is afforded with a clear rearward view of the bowl's cutting edge. Such disposition of the operator's cab also places the operator at a relatively noise-free and dust-free location on the vehicle. As shown in FIGS. 1 and 2, a standard ejector 56 is movably mounted in scraper bowl 36 for movement from its normal rearward position illustrated to a forward position for earth ejecting purposes.

What is claimed is:

1. A non-articulated scraper disposed on a longitudinal axis thereof comprising
   a front frame,
   an operator's station mounted forwardly on said front frame,
   a pair of front roadwheels,
   a pair of generally vertically disposed and laterally spaced suspension cylinder means each connected at its upper end to said front frame and at its lower end to a respective one of said roadwheels, said cylinder means acting as a king pin means for permitting said front roadwheels to pivot in a horizontal plane for steering purposes,
   steering linkage means pivotally interconnected between said front frame and said front roadwheels for selectively pivoting said front roadwheels,
   a rear frame mounted on a pair of rear roadwheels,
   a scraper bowl mounted on said rear frame,
   a pair of draft arms disposed on either side of said scraper bowl and pivotally interconnected directly to said scraper bowl and to said front frame, and
   actuating means interconnected to said scraper bowl and to said front frame for selectively raising and lowering said scraper bowl relative to said front frame.

2. The scraper of claim 1 wherein each suspension cylinder comprises a housing having its upper end pivotally connected to said front frame and a strut reciprocally mounted in said housing and having its lower end pivotally connected to a respective one of said front roadwheels.

3. The scraper of claim 2 wherein said front frame comprises a generally vertically disposed extension extending downwardly therefrom and further comprising a pair of links each having an inner end thereof pivotally mounted on a lower end of said extension and an outer end thereof pivotally connected to a lower end of a respective one of said struts.

4. The scraper of claim 3 wherein the outer end of each of said links is universally connected to the lower end of said strut by a ball and socket connection.

5. The scraper of claim 1 wherein said steering linkage means comprises a steering arm secured to an axlemounting bracket for each one of said front roadwheels, a pitman arm pivotally mounted on said front frame, a pair of tie rods each pivotally interconnected between a respective steering arm and said pitman arm and double-acting hydraulic steering cylinder means pivotally interconnected between said front frame and at least one of said steering arms.

6. The scraper of claim 1 wherein forward ends of said draft arms are mounted on the ends of a draft tube secured on a rearward end of said front frame.

7. The scraper of claim 6 further comprising an apron movably mounted on a forward end of said scraper bowl for movement between open and closed positions thereon and actuating means operatively interconnected between said front frame and said apron for selectively opening and closing the same.

8. The scraper of claim 1 wherein said rear roadwheels are rotatably mounted on an axle housing connected to said rear frame.

9. The scraper of claim 8 further comprising an A-frame having a pair of laterally spaced arms and rearwardly extending arms thereof secured to said axle housing and further having a forward end thereof universally connectted to said rear frame by a ball and socket connection.

10. The scraper of claim 9 further comprising at least one suspension cylinder pivotally interconnected between said axle housing and said rear frame.

11. The scraper of claim 10 further comprising a drag link pivotally interconnected between said axle housing and said rear frame.

12. The scraper of claim 1 further comprising ejector means movably mounted in said scraper bowl for movement from a normal rearward position to a forward postion therein.

* * * * *